United States Patent [19]
Gebhard

[11] 3,985,461
[45] Oct. 12, 1976

[54] BUTT JOINTS
[75] Inventor: Paul C. Gebhard, Little Falls, N.J.
[73] Assignee: Young Windows Inc., Conshohocken, Pa.
[22] Filed: May 8, 1973
[21] Appl. No.: 358,284

[52] U.S. Cl. .............................. 403/292; 52/758 H; 403/401
[51] Int. Cl.² ........................................... F16B 7/00
[58] Field of Search .......... 403/292, 401, 402, 109, 403/231; 52/758 H, 585, 753 E; 403/231

[56] References Cited
UNITED STATES PATENTS
| | | | |
|---|---|---|---|
| 2,804,952 | 9/1957 | Nothdurft | 403/401 |
| 2,861,659 | 11/1958 | Hagerty et al. | 403/231 |
| 3,467,415 | 9/1969 | Sandor | 403/109 |
| 3,797,194 | 3/1974 | Ekstein | 52/758 H |

FOREIGN PATENTS OR APPLICATIONS
| | | | |
|---|---|---|---|
| 1,426,294 | 12/1965 | France | 403/402 |
| 292,624 | 6/1916 | Germany | 403/401 |
| 1,914,488 | 10/1970 | Germany | 403/402 |
| 1,500,683 | 9/1969 | Germany | 403/401 |

*Primary Examiner*—H. Hampton Hunter
*Attorney, Agent, or Firm*—Frederick J. Olsson

[57] ABSTRACT

Tie bars which fasten abutting members (such as extrusions) and also function to draw the members into very tight engagement at the butt joint. The structure inhibits the members from moving apart and from twisting relative to one another.

2 Claims, 12 Drawing Figures

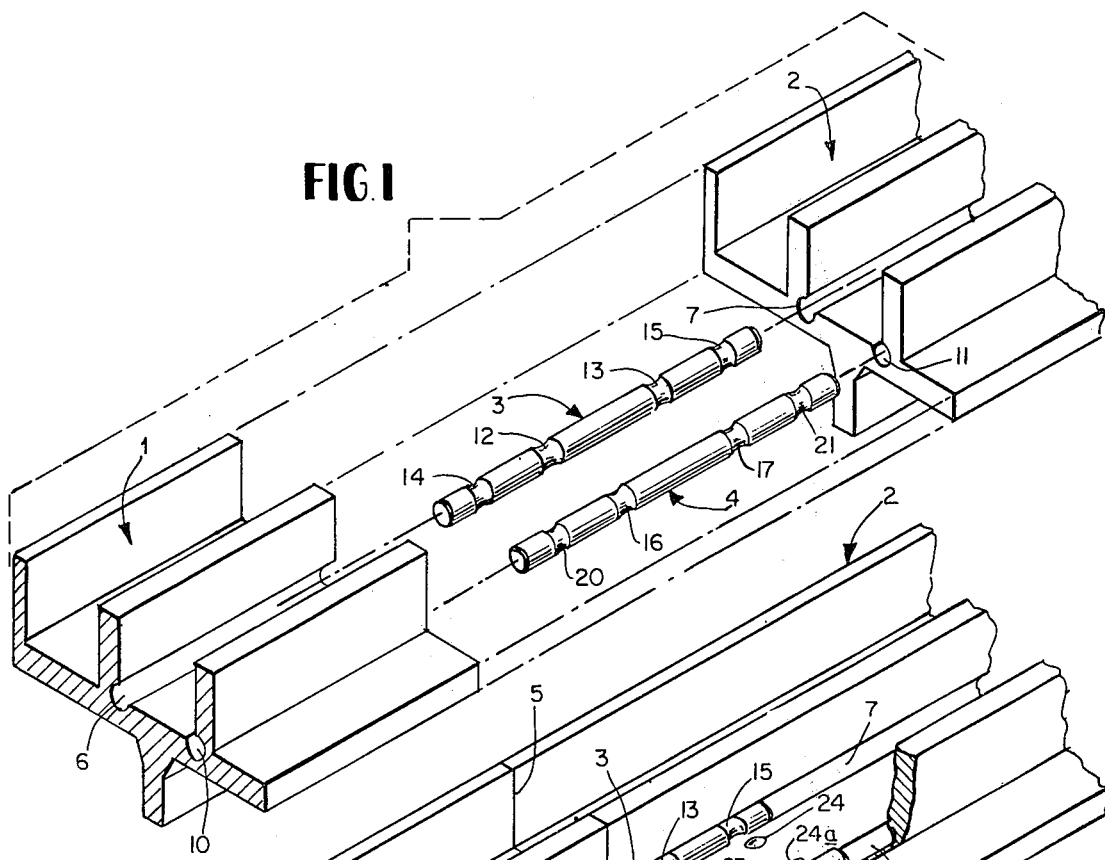
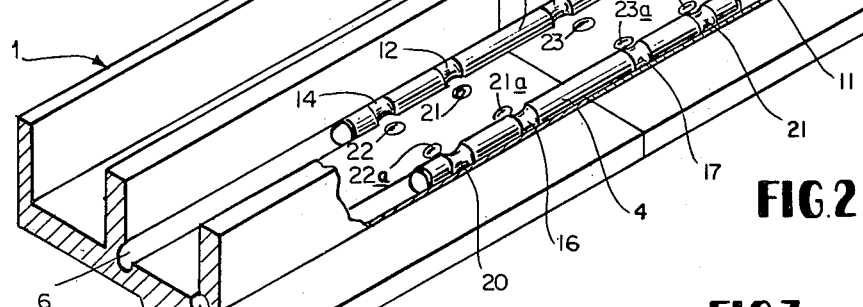
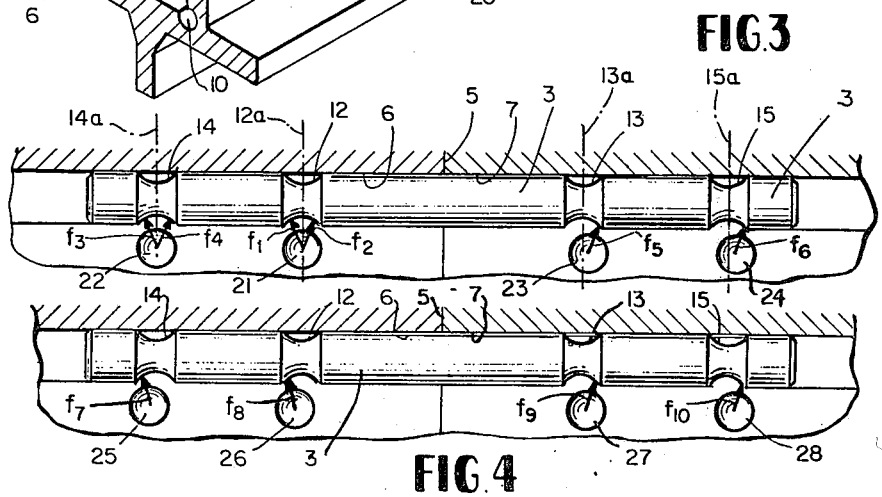

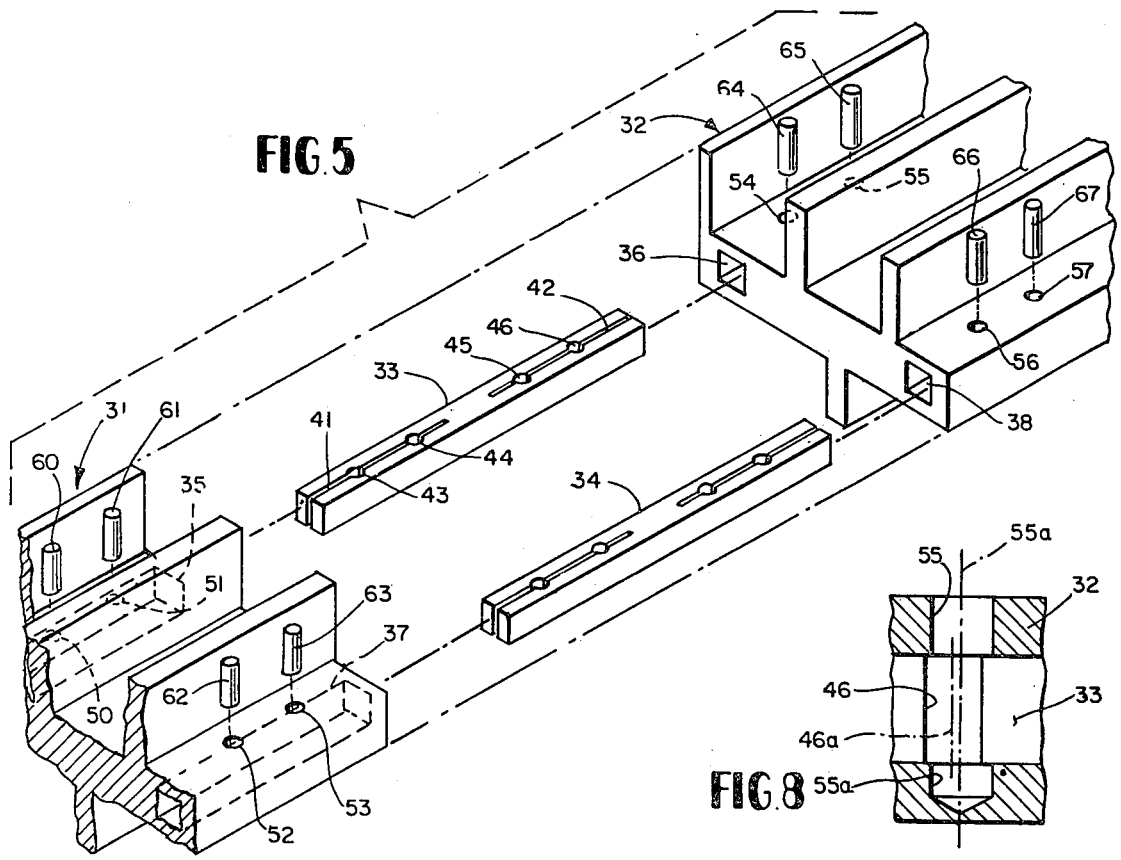
FIG.5
FIG.8
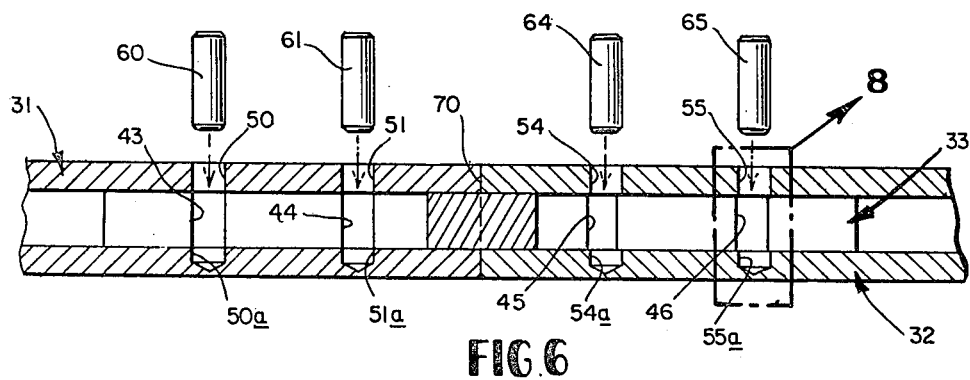
FIG.6
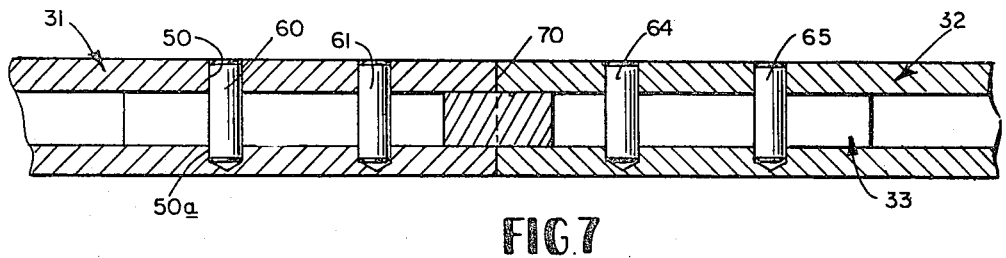
FIG.7

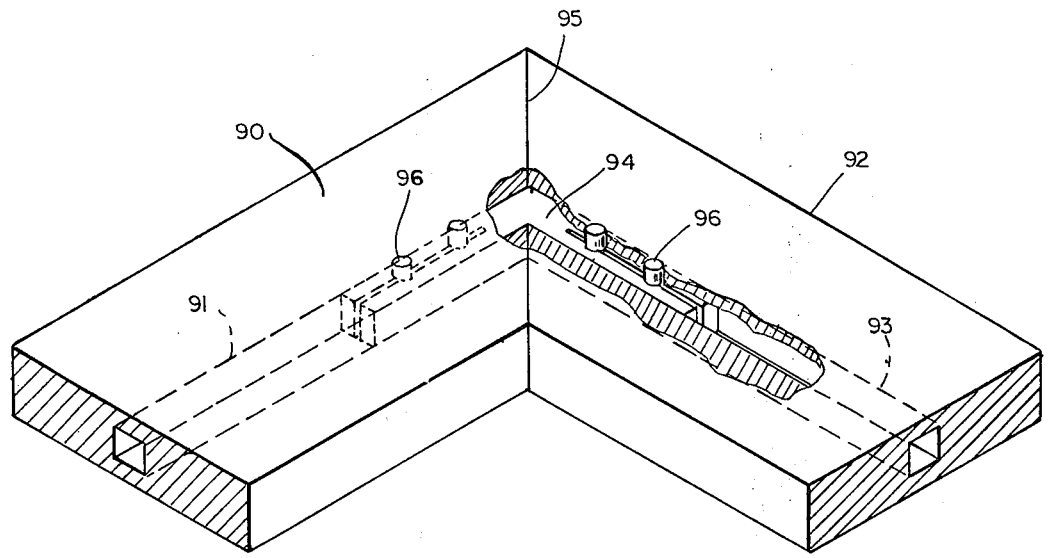
FIG. 12
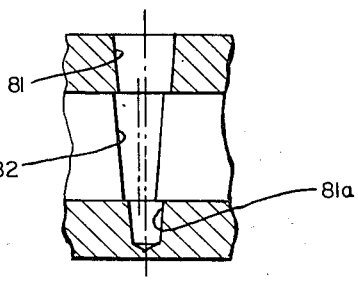
FIG. 11
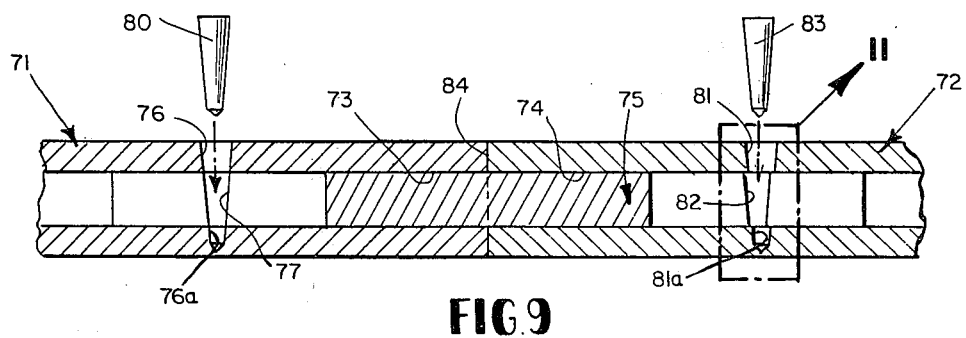
FIG. 9
FIG. 10

BUTT JOINTS

This invention relates to fastening means for butt joints especially joints in structural members such as frames, supports and the like.

The principal objectives of the invention are (a) to provide a structure for a high integrity joint which is especially useful in applications where the joints must have a superior resistance against moving apart and against twisting relative to one another; (b) to provide a joint-forming structure which, during assembly, functions to force members into tight engagement and to enhance the structural strength and improve the aesthetic appearance of the joint; and (c) to provide a joint structure which makes substantial savings in fabrication labor over joints fastened in conventional ways such as with standard straps secured by a multiplicity of screws in the abutting members.

The invention will be described below in connection with the following drawings wherein:

FIG. 1 is an exploded perspective view of two members and tie bars for connecting the same together;

FIG. 2 is a view showing the parts of FIG. 1 in assembled condition;

FIG. 3 is a fragmentary plan view of portions of FIG. 2 illustrating how the tie bars are manually worked to assemble the two members together;

FIG. 4 is a fragmentary plan view of portions of FIG. 2 illustrating how the tie bars and members are automatically worked for connecting the members together;

FIG. 5 is an exploded perspective view of a modified embodiment of the invention;

FIG. 6 is a fragmentary elevational view of the parts of FIG. 5 just prior to assembly;

FIG. 7 is a fragmentary elevational view of the parts of FIG. 6 in assembled condition;

FIG. 8 is an enlarged fragmentary view of the section 8 of FIG. 6;

FIG. 9 is an elevational view illustrating a modified version of the arrangement of FIG. 5 with the parts in position just prior to assembly;

FIG. 10 is a view of the parts of FIG. 9 in assembled condition;

FIG. 11 is an enlarged fragmentary view of the section 11 of FIG. 9; and

FIG. 12 is a perspective view illustrating the invention as joining two members together at a miter joint.

In FIG. 1, the straight or linearly extending members 1 and 2 are to be rigidly connected together by the circular tie bars 3 and 4 which are also straight or linearly extending. The members 1 and 2 as shown are preferably aluminum extrusions which form part of a recreational vehicle window assembly such as the type of window shown in U.S. Pat. No. 3,555,736 assigned to the assignee of this invention. It will be understood, however, that the members may be formed by various conventional methods other than by extrusion and may be used as structural components in a wide variety of other frame and support applications.

As noted in FIG. 2, the members are adapted to abut one another at the joint 5. The members contain pairs of aligned apertures which receive the tie bars 3 and 4.

The aligned pair of circular apertures 6 and 7 respectively in the members 1 and 2 receive the tie bar 3, while the aligned pair of circular apertures 10 and 11 in the members receive the tie bar 4. As will be observed, the apertures 6, 7, 10 and 11 are formed as straight or linearly extending slots with the mouth of each slot adjacent the surface of its member. The slots are formed in the extrusion process.

On each tie bar there are pairs of reduced diameter sections located so that in the assembled condition (FIG. 2) the sections are respectively disposed on opposite sides of the butt joint. The bar 3 has pairs of reduced diameter sections 12 and 13 on opposite sides of the joint 5 and pairs 14 and 15 also on opposite sides of the joint. The bar 4 has corresponding pairs 16 and 17 and pairs 20 and 21.

The foregoing structure contemplates either manual or automatic means for locking the members together. The manual procedure will be explained in connection with FIG. 3 and the bar 3 only since identical operations take place with the bar 4.

First, the bar 3 is placed in the aperture 6 and positioned so that the center of the bar is located adjacent the end of the member 1. Then the member 1 is punched or staked at the area 21. The center point of the punch is located on the center plane 12a of the reduced diameter area 12. The punching or staking operation causes the metal of the member to flow symmetrically, evenly into the area 12. This develops a force reaction between the pin and the member. The equal forces $f_1$ and $f_2$ push the bar against the wall of the aperture 6. Subsequently, or simultaneously, the area 22 is staked or punched so that the metal of the member 1 flows into the section 14. The center of the punch is located on the center plane 14a of the area 14. Equal forces $f_3$ and $f_4$ are developed which also push the pin 3 against the wall of the aperture 6. The forces and the extension of the metal into the sections 12 and 14 lock the tie bar in position and prevent the bar from moving axially in the aperture 6. The same kind of an operation is then carried out with respect to the tie bar 4 in the areas 21a and 22a (FIG. 2).

The member 2 is now moved up into abutting relationship with the member 1 at the joint 5 with the tie bars 3 and 4 respectively in the apertures 7 and 11. Then a staking or punching operation is performed separately, or simultaneously, on the areas 23 and 24 of member 2. The center point of the punch at area 23 is located so that it is off-set from the center plane 13a of the reduced diameter section 13 in a direction away from the butt joint 5. The center point of area 24 is similarly off-set from the center plane 15a.

Thus it will be seen that the center point of the punches in areas 23 and 24 are respectively off-set from the planes 13a and 15a containing the centers of the reduced areas 13 and 15. Because of the off-set, the flow of metal from the member 2 into the reduced section 13 and 15 is non-symmetrical and the force reaction developed between the bar and the member acts off-center. The off-set forces $f_5$ and $f_6$ push the bar against the wall of the aperture 7 and also operate to push the member 2 (to the left) against the member 1 so that the members tightly engage at the butt joint. The forces and the extension of the metal into the reduced sections lock the bar in position and prevent the same from moving axially in aperture 7. The same kind of operation is carried out with respect to the tie bar 4 in the areas 23a and 24a (FIG. 2).

In FIG. 4, I have illustrated the preferred manner for automatic staking. First, the members 1 and 2 are brought into engagement at the butt joint with the bars 3 and 4 positioned substantially symmetrically with respect to the joint 5. Then the areas 25 and 26 on member 1 and the areas 27 and 28 on the member 2 are simultaneously punched or staked. Metal of member 1 flows into the reduced areas 14 and 12 and metal of member 2 flows into the reduced areas 13 and 15. The centers of the punches are off-set from the center planes 14a, 12a, 13a and 15a of the reduced diameter sections. The offset forces indicated by the arrows $f_7$ and $f_8$ on member 1 and the off-set forces indicated by the arrows $f_9$ and $f_{10}$ on the member 2 force the bar against the apertures 6 and 7 and push the members 1 and 2 tightly together at the butt joint. In an automatic operation as described, it is contemplated that the bar 4 be worked simultaneously with the bar 3.

In FIG. 5, the modified embodiment includes the members or extrusions 31 and 32 which are to be butted together and fixedly held by the rectangular shaped tie bars 33 and 34. The rectangular shaped apertures 35 and 36 receive tie bar 33 and the rectangular shaped apertures 37 and 38 receive the tie bar 34. The apertures 35–38 are formed in the extrusion process.

The tie bar 33 has a pair of axially extending aligned slots 41 and 42 which extend from the end of the bar inwardly toward the center. In each slot there is a pair of locking grooves 43–44 and 45–46. Each pair is formed on the respective walls of the slot and extend normal to the axis of the slot.

The member 31 is provided with pairs of holding apertures 50, 51, 52 and 53 while the member 32 has holding apertures 54, 55, 56 and 57. The holding apertures 50 and 51 are for receiving the pins 60 and 61 while holding apertures 52 and 53 are for receiving the pins 62 and 63. In the member 32, the apertures 54 and 55 are for receiving the pins 64 and 65 and the apertures 56 and 57 are for receiving the pins 66 and 67.

The several holding apertures are open to the tie bar apertures and have lower extensions as noted at 50a, 51a, 54a and 55a in FIG. 6.

The structure of FIG. 5 contemplates that the members 31 and 32 be assembled and locked together by either manual or automatic means. The manual procedure will be explained in connection with FIGS. 6 and 7. Since the operation on each bar is the same, the explanation will be in connection with the bar 33.

First, the bars 33 and 34 are inserted into the apertures 35 and 37 to that the mid-point of each bar lies approximately at the end of the member. Then the holding apertures 50 and 51 and the locking grooves 43 and 44 are aligned. Next the pins 60 and 61 are driven into the holding apertures and locking grooves shown in FIG. 7. Note that in each holding aperture the pin penetrates the lower portion, for example, the pin 50 down into the portion 50a. The diameter of the pin 60 is approximately the same as the diameter of the holding aperture 50. However, the diameter of the pin 60 is larger than the diameter of the locking groove 43. The pin 61 is similarly dimensioned. When the pins are driven down into the holding grooves, the forces developed expand or push the tie bar against the wall of the aperture. The force and the extension of the pins 60 and 61 lock the tie bar in position and prevent the bar from moving axially in the aperture 35.

Then the member 32 is moved up into abutting relationship with the member 31 with the tie bars 33 and 34 extending into tie bar apertures 36 and 38.

The holding apertures 54 and 55 are located with respect to the end of member 32 and the locking grooves 45 and 46 are located on the tie bar so that when the members 31 and 32 are abutting and the pins 64 and 65 are driven down as in FIG. 8, the axes of the holding apertures 54 and 55 are off-set from the axes of the locking grooves 45 and 46 in a direction away from the butt joint 70. This is best indicated in FIG. 8 where the holding apertures axis 55a is off-set (to the right) from the locking groove axis 46a. The same relationship obtains for the tie bar 34 and the corresponding holding apertures and locking grooves.

Thus, when the pins 64 and 65 are driven in, each pin, say the pin 65 first enters the holding aperture 55 and then enters the locking groove 46. Due to the offset, the entry of the pin into the locking groove develops a force reaction between the tie bar 33 and the member 32. Since the tie bar is fixed, the force pushes the member 32 (to the left) against the member 31 so that the same are tightly engaged at the joint 70. Additionally, the diameter of the pin 65 is larger than the locking groove 46 and the forces developed expand or push the tie bar 33 against the wall of the aperture 36. The pin 64, holding aperture 54 and locking groove 45 are similarly dimensioned so that similar forces push the bar against the aperture and push the members together. The forces and the pin lock the tie bar in position.

Before going on, it is to be noted that in the preferred manner of operation, the pins 64–67 are driven in simultaneously so as to obtain symmetrical force reaction and maximum effect at the butt joint.

Incidentally, it will be noted that the head of each of the pins 64–67 is chamfered. This condition is desirable in order to enhance the penetration of the pin into the locking groove.

The use of round pins, holding apertures and locking grooves is preferred from the stand-point of economy in manufacture and for use with softer metals such as aluminum. With harder metals such as steel, tapered pins, holding apertures and locking grooves are used. This is noted in FIGS. 9 and 10 wherein the members 71 and 72 have aligned tie bar apertures the same as the members 31 and 32 of FIG. 5, one pair of which is indicated at 73 and 74. The apertures 73 and 74 support the tie bar 75 which is identical to the tie bars 33 and 34 except for the shape of the holding apertures and the locking grooves as noted below.

The member 71 has tapered holding aperture 76 and the tie bar 75 has tapered locking groove 77. With the aperatures and holding grooves aligned, the tapered pin 80 can be driven in as shown in FIG. 9. The pin goes through to the lower extension 76a. The diameter of the pin 80 is such that it makes a snug fit with the holding aperture. However, the diameter is larger than the locking groove 77 so that the tie bar is spread apart and pushed against the wall of the tie bar aperture 73. The force and the pin hold the bar in position.

The member 72 has holding aperture 81 and the tie bar has locking groove 82. The apertures and grooves are located so that the holding aperture is off-set from the locking groove when the members 71 and 72 are butted as noted in FIGS. 9 and 11. When the pin 83 is driven in, the tie bar is spread apart and pushed against the wall of the aperture 74. Furthermore, due to the off-set, the force reaction pushes the member 72 (to the left) tightly against the member 71 and the joint 84. The force and pin 83 lock the bar 75 in the aperture 74. The position of the parts with the pins driven all the way in is indicated in FIG. 10.

In FIG. 12, I have shown a typical arrangement for utilizing the invention to fasten members at a mitered joint.

The member 90 has aperture 91 and the member 92 has aperture 93. The right angled tie bar 94 is disposed in the apertures 91 and 93 and extends across the joint 95. The tie bar has the same kind of slots and locking grooves as the bars 33 and 34 and the members 90 and 92 have the same kind of holding apertures as the members 31 and 32. The pins 96 operate in the holding apertures and locking grooves in the same manner as the pins described in connection with FIGS. 5, 6 and 7. In assembling the parts of FIG. 12, it is preferred that the pins 96 be simultaneously driven into the holding apertures and the locking grooves.

I claim:

1. A joint structure for fastening two abutting members of a window assembly comprising:
   - a pair of linearly extending metal members disposed in abutting relationship;
   - a pair of aligned, linearly extending slots respectively formed in said members with the mouth of each slot being on the surface of its member;
   - an elongated linearly extending tie bar disposed in said slots and extending across the butt joint, the open slot making the bar accessible from the surfaces;
   - a pair of axially spaced, reduced sections on the tie bar respectively disposed in said slots on opposite sides of said butt joint;
   - on each member, a section of metal thereof extending from the mouth of the slot into said reduced section and engaging the tie bar and exerting a force on the tie bar, said extention being the result of metal flow caused by staking the member at the mouth of the slot adjacent the reduced section; on one member, said force of said metal extension causing a force reaction between the bar and the member operating to push the bar against the wall of the slot, the force and the extension locking the bar in position and preventing the bar from moving axially in the slot; and
   - on the other member, said metal extension causing a force reaction between the bar and the member operating to push the bar against the wall of the slot and also operating to push the other member tightly against said one member so that the members tightly engage at the butt joint, the force and the extension locking the bar in position and preventing the bar from moving axially in the slot.

2. A construction in accordance with claim 1 wherein the apertures and the tie bars are round in cross-sections.

* * * * *